(12) United States Patent
Kaito (10) Patent No.: US 11,509,652 B2
(45) Date of Patent: Nov. 22, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Satoshi Kaito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 310 days.

(21) Appl. No.: 16/458,202

(22) Filed: Jul. 1, 2019

(65) Prior Publication Data
US 2020/0021584 A1 Jan. 16, 2020

(30) Foreign Application Priority Data
Jul. 10, 2018 (JP) .............................. JP2018-130830

(51) Int. Cl.
*H04L 9/40* (2022.01)
*G06F 16/27* (2019.01)
*G06F 16/182* (2019.01)
*H04L 67/1097* (2022.01)

(52) U.S. Cl.
CPC ...... *H04L 63/0869* (2013.01); *G06F 16/1827* (2019.01); *G06F 16/275* (2019.01); *H04L 63/166* (2013.01); *H04L 67/1097* (2013.01)

(58) Field of Classification Search
CPC . H04L 63/0869; G06F 16/1827; G06F 16/275
See application file for complete search history.

(56) References Cited

U.S. PATENT DOCUMENTS

| 6,446,175 B1 * | 9/2002 | West | G06F 11/1456 |
| | | | 711/161 |
| 6,643,795 B1 * | 11/2003 | Sicola | G06F 11/2069 |
| | | | 714/11 |
| 7,383,462 B2 * | 6/2008 | Osaki | G06F 11/1464 |
| | | | 705/50 |

(Continued)

FOREIGN PATENT DOCUMENTS

| CN | 103780363 | 5/2014 |
| CN | 107302643 | 10/2017 |
| JP | 2002157184 | 5/2002 |

(Continued)

OTHER PUBLICATIONS

"Office Action of Japan Counterpart Application" with English translation thereof, dated Apr. 5, 2022, p. 1-p. 5.

(Continued)

*Primary Examiner* — Esther B. Henderson
(74) *Attorney, Agent, or Firm* — JCIPRNET (57) ABSTRACT

An information processing apparatus includes a transfer part that, in a case where an authentication process for connecting to a preset first storage area fails and transfer of a document processed in accordance with a preset process procedure to the first storage area fails, transfers the document to a second storage area, and in a case where the authentication process succeeds after the document is transferred to the second storage area, transfers the document stored in the second storage area to the first storage area.

11 Claims, 7 Drawing Sheets

(56) References Cited

U.S. PATENT DOCUMENTS 9,037,935 B2    5/2015   Yun et al.
10,178,249 B2    1/2019   Kuno

FOREIGN PATENT DOCUMENTS

| JP | 2015-153117 | 8/2015 |
| JP | 2015154299 | 8/2015 |
| JP | 2015-228194 | 12/2015 |
| JP | 2017192110 | 10/2017 |

OTHER PUBLICATIONS

"Office Action of China Counterpart Application", dated Sep. 21, 2022, with English translation thereof, pp. 1-16.

\* cited by examiner

| USER ID | USED CLOUD SERVICE | AUTHENTICATION INFORMATION | |
|---|---|---|---|
| UserA | ServiceA | passwordA1 | ~22 |
| UserA | ServiceB | passwordA2 | |
| UserB | ServiceA | passwordB | |
| UserC | ServiceC | passwordC | |

FIG. 5

| FLOW ID | USER ID | USED CLOUD SERVICE | ALTERNATIVE STORAGE DESTINATION | DESIGNATED STORAGE DESTINATION | ACCESS HISTORY |
|---|---|---|---|---|---|
| 001 | UserA | ServiceA | ¥¥abc¥UserA¥001.pdf | http://ServiceA/UserA/001.pdf | 06/22/2018 10:02:47 |
| 002 | UserB | ServiceB | ¥¥abc¥UserB¥002.pdf | http://ServiceA/UserB/002.pdf | 06/22/2018 10:04:42 |
| 003 | UserC | ServiceA | ¥¥abc¥UserC¥003.pdf | http://ServiceC/UserC/003.pdf | 06/22/2018 10:05:50 |
| 004 | UserA | ServiceC | ¥¥abc¥UserA¥004.pdf | http://ServiceB/UserA/004.pdf | - |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-130830 filed Jul. 10, 2018.

BACKGROUND

(i) Technical Field

The present invention relates to an information processing apparatus and a non-transitory computer readable medium storing an information processing program.

(II) RELATED ART

JP2015-228194A discloses a cloud service relay apparatus that relays communication between a cloud server providing a cloud service including a data storage service and an information processing terminal using the cloud service provided by the cloud server, and includes a storage section which stores account information for accessing each of a plurality of storage areas disposed in the cloud server and user information in which a user who can access each of the plurality of storage areas is registered, a retention destination specifying section which specifies a storage area accessible by the user as a retention destination storage area from the plurality of storage areas and detects whether or not the retention destination storage area has a remaining capacity for retaining upload data when data is uploaded and retained in the cloud server based on an instruction from the user registered in the user information, an alternative area selection section that selects another storage area for retaining the upload data as an alternative storage area from the plurality of storage areas in a case where the retention destination specifying section determines that the retention destination storage area does not have a remaining capacity for retaining the upload data, a data retention processing section that transmits the upload data to the cloud server and retains the upload data in the alternative storage area, generates link information including access information for accessing the cloud service relay apparatus and identification information for identifying the upload data retained in the alternative storage area, and retains the link information in the retention destination storage area in a case where the alternative area selection section selects the alternative storage area, a service relay section that specifies the alternative storage area and the upload data retained in the alternative storage area based on the identification information transmitted from the information processing terminal, acquires the upload data from the cloud server, and transmits the upload data to the information processing terminal when an access from the information processing terminal based on the link terminal is detected.

JP2015-153117A discloses a system that is a document generation system in which a client terminal, a cloud platform service, and a document generation server are connected through a network, and includes the cloud platform service including an access control part which issues an access token in response to a request from the document generation server, a data management part which transmits task data in response to a request from the document generation server, and an execution history management part which creates execution history information as an execution result of a scheduled job and updates the execution history information in response to a request from the document generation server, the execution history management part creating a history ID uniquely identifying the execution result of the scheduled job as schedule information; and the document generation server including a scheduler service including a schedule management part which manages the scheduled job as schedule information and transmits the schedule information in response to a request from a document generation service, and a job execution management part which creates a subsequent execution date and time from a schedule setting and an end date and time included in the schedule information, the schedule information including a job parameter as a document generation parameter and a transmission destination mail address for transmitting a generated document, and the document generation service including an acquisition part which acquires the access token of the cloud platform service, a setting management part that retains the access token acquired from the cloud platform service in association with a tenant ID, a data access part that acquires the task data from the cloud platform service using the access token acquired by the acquisition part, a data access part which acquires the task data acquired from the cloud platform service, a document generation part which generates document data from the task data and a form, a transmission and reception part which transmits a scheduled job registration request to the scheduler service, requests a mail transmission service to transmit an electronic mail with the document data as an attachment, and acquires the scheduled job from the scheduler service, and an execution history management part which requests the cloud platform service to write a document generation process history using the acquired access token.

SUMMARY

In recent years, an information processing service for processing a document in accordance with a process procedure created in advance has drawn attention.

In the information processing service, a process that is defined in the process procedure is executed on the document, and the processed document is transferred to a transfer destination apparatus designated by the user.

In the case of transferring the document to the transfer destination apparatus, an authentication process using authentication information such as a password is preliminarily performed in the transfer destination apparatus from the viewpoint of security, and the document is transferred after access to the transfer destination apparatus is permitted by the authentication process.

Accordingly, in the information processing service in the related art, for example, the process may be stopped in a case where the authentication process fails by using erroneous authentication information different from the authentication information registered in advance in the transfer destination apparatus in the authentication process. In this case, in order for the user to acquire the document processed by the information processing service, the authentication information needs to be corrected to correct authentication information. Then, the process stopped by the failure of the authentication process needs to be executed again, and the document needs to be transferred to the storage area of the designated transfer destination apparatus.

Aspects of non-limiting embodiments of the present disclosure relate to an information processing apparatus and a non-transitory computer readable medium storing an information processing program that acquires a document without executing a process procedure including transfer of the document again even in a case where an authentication process executed for transferring the document to a preset storage area fails.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a transfer part that, in a case where an authentication process for connecting to a preset first storage area fails and transfer of a document processed in accordance with a preset process procedure to the first storage area fails, transfers the document to a second storage area, and in a case where the authentication process succeeds after the document is transferred to the second storage area, transfers the document stored in the second storage area to the first storage area.

BRIEF DESCRIPTION OF THE DRAWINGS

Exemplary embodiment(s) of the present invention will be described in detail based on the following figures, wherein.

DETAILED DESCRIPTION

Hereinafter, the present exemplary embodiment will be described with reference to the drawings. Constituents and processes having the same functions will be designated by the same reference signs throughout all drawings, and descriptions of such constituents and processes will not be repeated.

Figure 1:
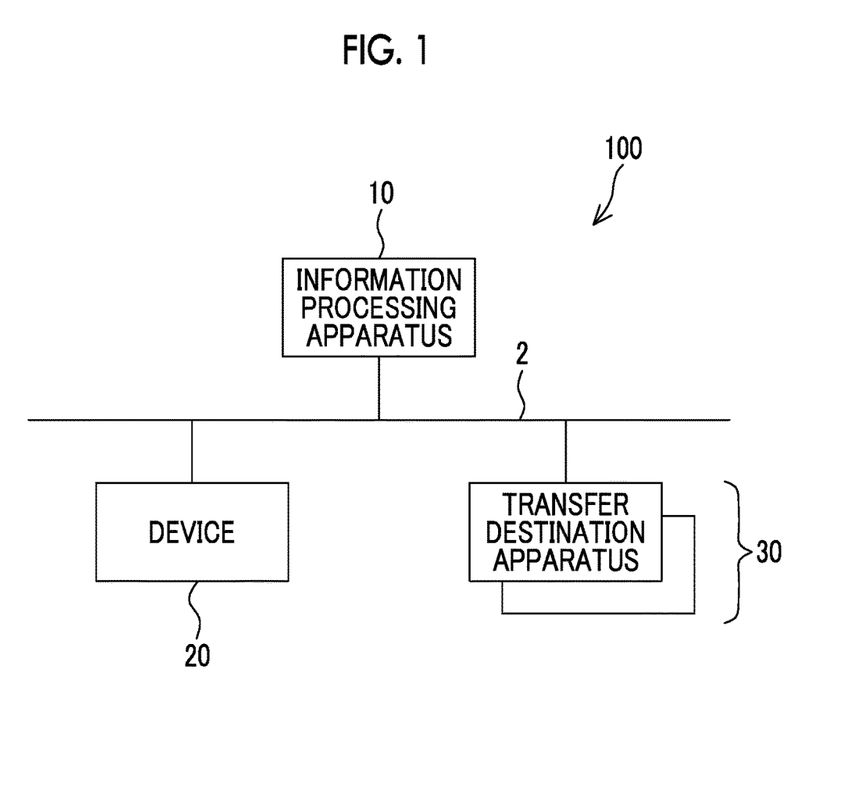
FIG. 1 is a diagram illustrating a configuration example of an information processing system.

FIG. 1 is a diagram illustrating a configuration example of an information processing system 100 according to the present exemplary embodiment. As illustrated in FIG. 1, the information processing system 100 includes an information processing apparatus 10, a device 20, and a plurality of transfer destination apparatuses 30. The information processing apparatus 10, the device 20, and each transfer destination apparatus 30 are connected to a communication line 2.

The information processing apparatus 10 is an apparatus that executes various processes defined in a preset process procedure on a document acquired from the device 20 in accordance with the process procedure. The information processing apparatus 10 transfers the document (hereinafter, referred to as a "processed document") processed by the information processing apparatus 10 to a preset storage area of a transfer destination (in the example in FIG. 1, the transfer destination apparatus 30) that is designated by a user.

The "document" generally refers to electronic data for notifying a person of any information. The document includes a character, a figure, a sign, an image, a video, an audio, and the like and also includes a property that represents arrangement information related to the character, the image, and the like and the characteristics of the document. The "property" represents information such as a file name for identifying the document and a creator and creation date and time of the created document that is used for managing the document.

The content of the process executed by the information processing apparatus 10 in accordance with the process procedure is not restricted. The process may be a process such as a noise removal process, an enlarging and shrinking process, and a font changing process that affect the appearance of the document, and may also be a process such as addition of an electronic signature that does not affect the appearance of the document.

The device 20 is a device that provides a document to the information processing apparatus 10. For example, a scan device that generates electronic data by optically reading the content of an original document set on a platen glass, or a storage device that stores a document received by a facsimile apparatus is used as the device 20. The installation location of the device 20 is not restricted. The device 20 may be installed at a store or a public facility visited by an unspecified number of people or may be installed at a location such as a company or a school that only a person permitted in advance is allowed to enter.

The transfer destination apparatus 30 is an apparatus to which the processed document is transferred from the information processing apparatus 10. The transfer destination apparatus 30 that is a transfer destination of the processed document is designated by the user receiving the processed document, that is, a recipient of the document (hereinafter, referred to as the "recipient"), among the plurality of transfer destination apparatuses 30. In a case where the transfer destination apparatus 30 receives the processed document, the transfer destination apparatus 30 stores the transferred processed document in a preset storage area of the transfer destination apparatus 30. The storage area of the transfer destination apparatus 30 to which the processed document processed by the information processing apparatus 10 is transferred is one example of a first storage area according to the exemplary embodiment.

The communication line 2 that connects the information processing apparatus 10, the device 20, and the transfer destination apparatus 30 may be a wireless line or a wired line and may be a dedicated line or a public line to which an unspecified number of apparatuses are connected.

The information processing apparatus 10, the device 20, and the transfer destination apparatus 30 included in the information processing system 100 are not restricted in numbers. For example, a plurality of information processing apparatuses 10 and a plurality of devices 20 may be included in the information processing system 100.

The information processing apparatus 10 and each transfer destination apparatus 30 may be, for example, cloud servers that provide a preset service using cloud computing constructed by connecting a plurality of computers. Hereinafter, it is illustratively assumed that a storage service for the processed document provided by the transfer destination apparatus 30 is provided as a cloud service, and the recipient has a contract for using the cloud service in advance with a cloud service provider who manages the transfer destination apparatus 30 designated as the transfer destination of the processed document.

Figure 2:
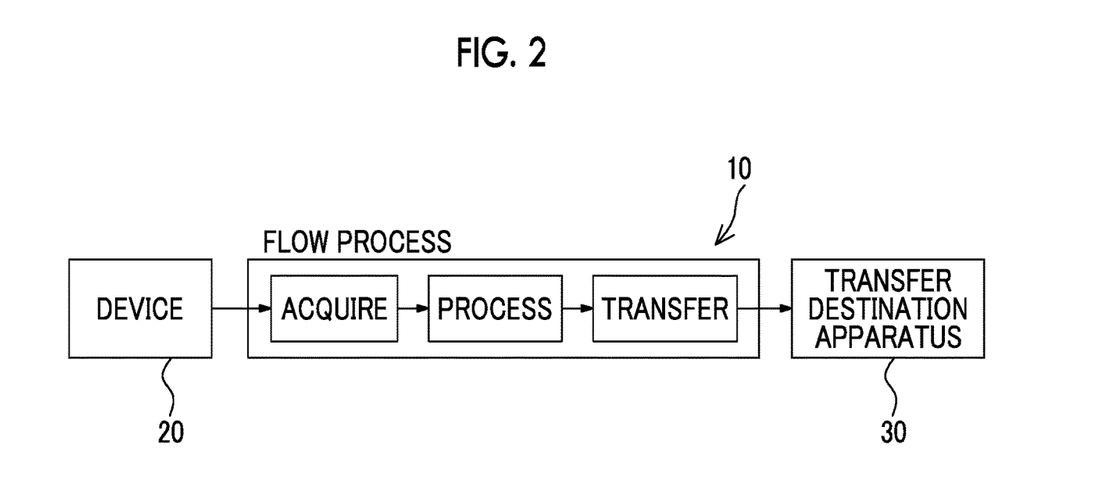
FIG. 2 is a diagram illustrating one example of a process flow in the information processing system.

FIG. 2 is a diagram illustrating one example of a course of processing information in the information processing system 100 and illustrates, for example, an example of executing a flow process by the information processing apparatus 10 on the document acquired from the device 20 and transferring processed information processed by the flow process to the transfer destination apparatus 30. The "flow process" is a series of processes complying with the preset process procedure.

For example, the process procedure is created by a manager of the information processing system 100, and the created process procedure is managed as a "flow definition" by the information processing apparatus 10. For example, the content of the process in each process from the input to the output of the document to be processed in the information processing apparatus 10, the execution timing of the process, and a process order are defined in the flow definition.

The recipient selects a flow definition providing a desired process from a plurality of flow definitions created by the manager and acquires the processed document. In a case where a flow definition providing a desired process is not present among the set flow definitions, the recipient may create the flow definition.

Figure 3:
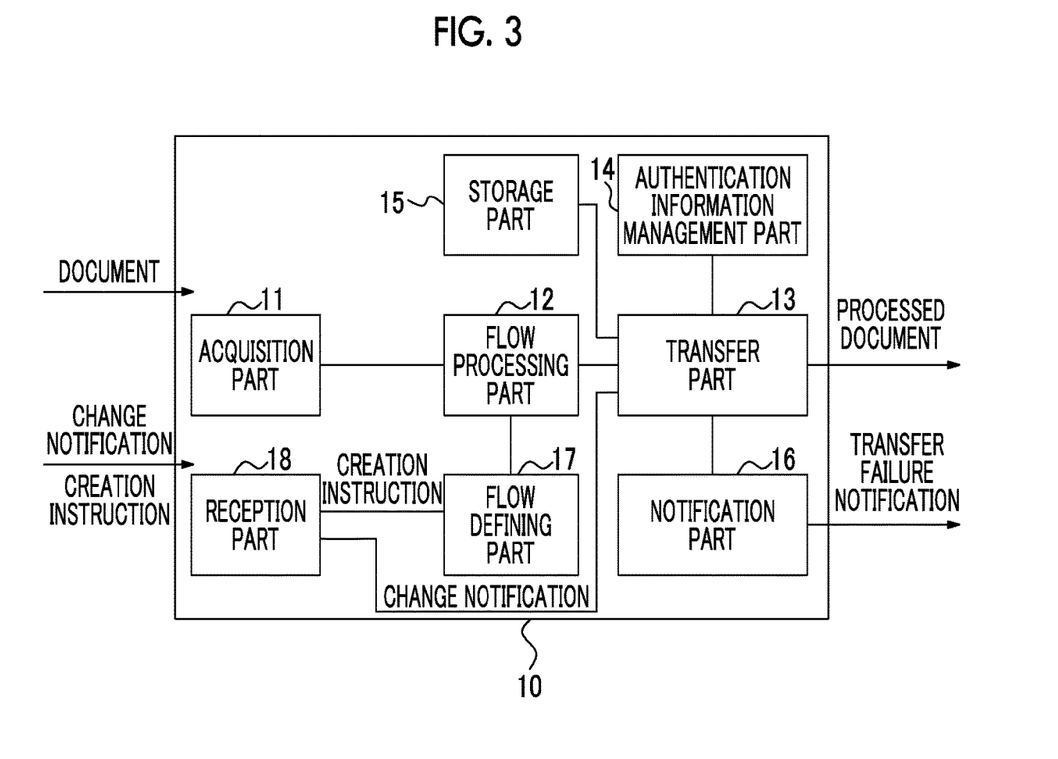
FIG. 3 is a diagram illustrating a functional configuration example in an information processing apparatus.

FIG. 3 is a diagram illustrating a functional configuration example in the information processing apparatus 10. The information processing apparatus 10 includes an acquisition part 11, a flow processing part 12, a transfer part 13, an authentication information management part 14, a storage part 15, a notification part 16, a flow defining part 17, and a reception part 18.

The acquisition part 11 acquires the document from the designated device 20 and passes the acquired document to the flow processing part 12.

In a case where the flow processing part 12 receives the document from the acquisition part 11, the flow processing part 12 executes a process complying with the flow definition selected by the recipient (hereinafter, referred to as the "selected flow definition") and passes the processed document to the transfer part 13.

In a case where the transfer part 13 receives the processed document from the flow processing part 12, the transfer part 13 transfers the processed document to the storage area of the designated transfer destination apparatus 30. In a case where the transfer part 13 transfers the processed document to the transfer destination apparatus 30, the transfer destination apparatus 30 executes an authentication process so that an incorrect transfer is not performed from the recipient to which the processed document is not permitted to be transferred, that is, the recipient who does not have a contract for the cloud service. In a case where the authentication process succeeds, that is, in a case where it is determined that the information processing apparatus 10 that is to transfer the processed document transfers the processed document of the recipient having a contract for the cloud service provided by the transfer destination apparatus 30, the transfer destination apparatus 30 receives transfer of the processed document from the information processing apparatus 10 and stores the received processed document in a designated storage area.

Accordingly, before transferring the processed document to the transfer destination apparatus 30, the transfer part 13 transfers authentication information that is preset in the information processing apparatus 10 by the recipient and is to be used in the authentication process for the cloud service provided by the transfer destination apparatus 30 to the transfer destination apparatus 30 along with a user identification (ID) uniquely identifying the user.

The transfer destination apparatus 30 compares the user ID and the authentication information transferred from the information processing apparatus 10 with authentication information corresponding to the user ID managed by the transfer destination apparatus 30 and determines that the authentication process succeeds in a case where each authentication information is the same.

Figure 4:
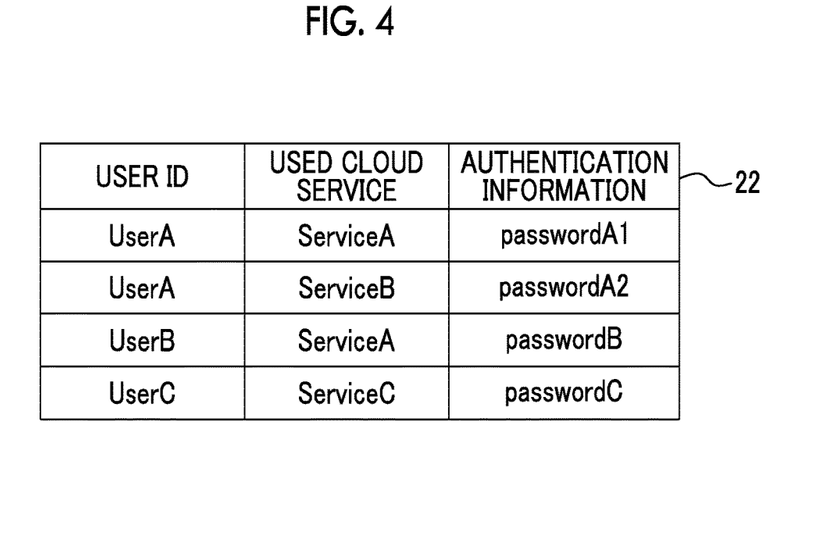
FIG. 4 is a diagram illustrating one example of an authentication information management table.

The authentication information used in the authentication process is managed by the authentication information management part 14. FIG. 4 is a diagram illustrating one example of an authentication information management table 22 managed by the authentication information management part 14. As illustrated in FIG. 4, in the authentication information management table 22, the user ID of the recipient, the cloud service for which the recipient has a contract, that is, the cloud service name of the used cloud service, and the authentication information registered in the cloud service by the recipient are managed in association with each other. In a case where one recipient has a contract for a plurality of cloud services, the authentication information that is registered for each cloud service is managed in the authentication information management table 22.

For example, a character string is used as the authentication information. Information other than a character string such as an image of the face of the recipient may also be used as the authentication information.

The recipient may update the authentication information in order to increase security performance. However, for example, a situation in which the recipient updates the authentication information registered in the cloud service but does not update the authentication information registered in the authentication information management table 22 may occur. In this case, the authentication information registered in the transfer destination apparatus 30 with respect to the recipient is different from the authentication information registered in the information processing apparatus 10 with respect to the recipient. Thus, the authentication process fails, and transfer of the processed document fails.

Accordingly, the transfer part 13 stores the processed document subjected to a failure of transfer in the storage part 15 by transferring the processed document subjected to the failure of transfer to the storage part 15. The storage part 15 that stores the processed document subjected to the failure of transfer to the transfer destination apparatus 30 is one example of a second storage area according to the exemplary embodiment.

The transfer in which the processed document subjected to the failure of transfer to the transfer destination apparatus 30 is transferred to the storage part 15 by the transfer part 13 may be referred to as "internal transfer".

In a case where the transfer part 13 performs the internal transfer, the transfer part 13 records the status of the internal transfer in an internal transfer management table 24.

Figure 5:
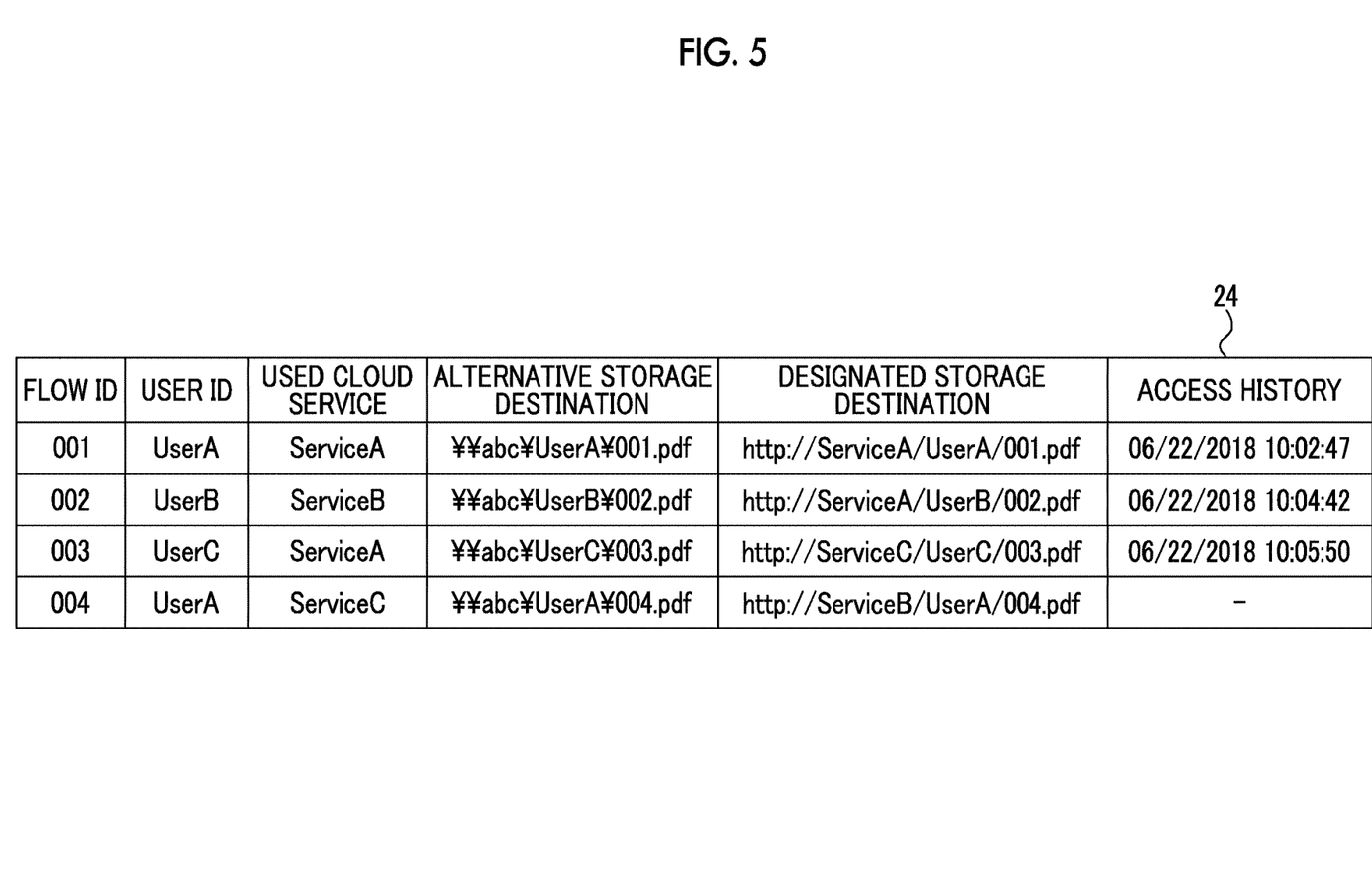
FIG. 5 is a diagram illustrating one example of an internal transfer management table.

FIG. 5 is a diagram illustrating one example of the internal transfer management table 24. As illustrated in FIG. 5, the internal transfer management table 24 manages an internal transfer log in which a flow ID, the user ID, the used cloud service, an alternative storage destination, a designated storage destination, and an access history are associated with each other.

The flow ID is identification information that uniquely identifies the flow process performing the internal transfer. The alternative storage destination represents the storage destination (alternative storage area) of the processed document in the storage part 15 and the file name of the stored processed document. The designated storage destination represents the storage destination of the processed document in the transfer destination apparatus 30 that is the transfer destination of the processed document designated by the recipient, that is, the storage destination to which the processed document is transferred in a case where the authentication process succeeds, and the file name of the stored processed document. The access history is one example of an acquisition history that represents whether or not the recipient accesses the alternative storage area and acquires the processed document. In a case where the recipient acquires the processed document from the alternative storage area, date and time information related to the acquisition of the processed document is recorded in an access history field. Recording is not performed in a case where the recipient does not access the alternative storage area. In FIG. 5, a sign "-" in the access history field represents that the recipient does not access the alternative storage area.

In order for the recipient to access the alternative storage area, an internal authentication process that uses authentication information preset by the recipient for accessing the storage part 15, that is, internal authentication information, is needed. The recipient may set the internal authentication information to have a different content or the same content as the authentication information used in the authentication process of the transfer destination apparatus 30. The internal authentication information is managed for each recipient by the authentication information management part 14.

A setting method for the internal authentication information is not limited to the above method. The information processing apparatus 10 may set common internal authentication information for each recipient. In this case, the recipient does not need to set the internal authentication information in advance in the information processing apparatus 10.

In a case where the authentication process fails in the transfer part 13, and the processed document is transferred to the storage part 15, the notification part 16 transmits a transfer failure notification for informing the recipient of the processed document about the alternative storage destination of the internally transferred processed document to a mail address or the like designated in advance by the recipient. For example, the transfer failure notification includes the used cloud service experiencing the failure of transfer and the alternative storage destination. In a case where the internal authentication information is the authentication information set by the information processing apparatus 10, the notification part 16 includes the internal authentication information in the transfer failure notification because the recipient does not know about the internal authentication information. In a case where the recipient sets the internal authentication information, the recipient knows about the internal authentication information. Thus, the notification part 16 does not include the internal authentication information in the transfer failure notification.

The recipient who receives the transfer failure notification transmits a change notification for informing the information processing apparatus 10 about a change of the authentication information registered in the information processing apparatus 10 to correct authentication information to the information processing apparatus 10 using an information apparatus such as a smartphone that has a communication function.

In a case where the reception part 18 receives the change notification, the reception part 18 passes the received change notification to the authentication information management part 14 through the transfer part 13.

The authentication information management part 14 that receives the change notification changes the authentication information corresponding to a combination of the user ID and the cloud service designated in the change notification to authentication information after change designated in the change notification. In a case where the change notification is received from the recipient, the transfer part 13 acquires the internal transfer log including the same user ID and the same cloud service as the user ID and the cloud service included in the change notification by referring to the internal transfer management table 24 and executes the authentication process for the transfer destination apparatus 30 indicated by the designated storage destination in the acquired internal transfer log using the authentication information after change. In a case where the authentication process succeeds, the transfer part 13 acquires the processed document subjected to the failure of transfer from the alternative storage area indicated by the alternative storage destination in the acquired internal transfer log and transfers the processed document to the storage area of the transfer destination apparatus 30 indicated by the designated storage destination.

The transfer part 13 deletes the internal transfer log corresponding to the processed document subjected to a success in transfer to the designated transfer destination apparatus 30 from the internal transfer management table 24.

In a case where the reception part 18 receives a creation instruction for the process procedure, the reception part 18 passes the received creation instruction to the flow defining part 17.

In a case where the flow defining part 17 receives the creation instruction from the reception part 18, the flow defining part 17 creates a flow definition that implements the process procedure in the creation instruction.

While an example in which the information processing apparatus 10 includes the storage part 15 is illustrated in the functional configuration example illustrated in FIG. 3, the information processing apparatus 10 may not necessarily include the storage part 15. For example, the information processing apparatus 10 may use a storage device, not illustrated, connected to the communication line 2 as the storage part 15. In the exemplary embodiment, the information processing apparatus 10 will be illustratively described as including the storage part 15.

For example, the information processing apparatus 10 having the functional configuration example illustrated in FIG. 3 is configured using a computer 40.

Figure 6:
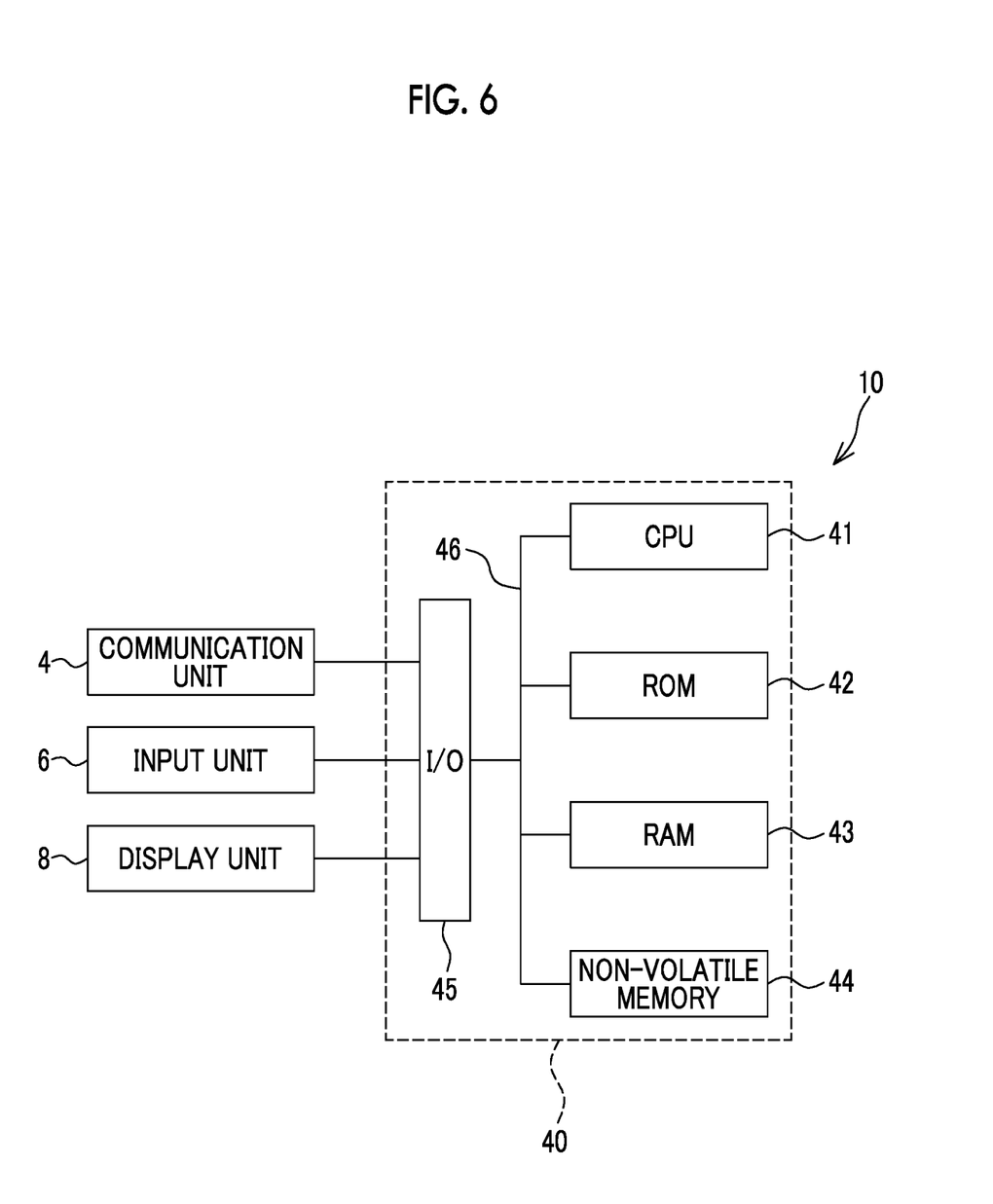
FIG. 6 is a diagram illustrating a main configuration example of an electrical system in the information processing apparatus.

FIG. 6 is a diagram illustrating a main configuration example of an electrical system in the information processing apparatus 10.

The computer 40 includes a central processing unit (CPU) 41 that performs the function of each function part illustrated in FIG. 3, a read only memory (ROM) 42 that stores a program, a random access memory (RAM) 43 that is used as a temporary work area of the CPU 41, a non-volatile memory 44, and an input-output interface (I/O) 45. The CPU 41, the ROM 42, the RAM 43, the non-volatile memory 44, and the I/O 45 are connected to each other through a bus 46.

The non-volatile memory 44 is one example of a storage device that maintains stored data even in a case where electric power supplied to the non-volatile memory 44 is shut off. For example, a semiconductor memory is used as the non-volatile memory 44. A hard disk may also be used.

For example, the authentication information management table 22, the internal transfer management table 24, and the processed document subjected to the failure of transfer are stored in the non-volatile memory 44.

A communication unit 4, an input unit 6, and a display unit 8 are connected to the I/O 45.

The communication unit 4 is connected to the communication line 2 and includes a communication protocol for transmitting and receiving data with the device 20 and the transfer destination apparatus 30 included in the information processing system 100.

For example, the input unit 6 is an input device that receives an instruction from the manager of the information processing system 100 and notifies the CPU 41 of the instruction. For example, a button, a touch panel, a keyboard, and a mouse are used as the input unit 6.

The display unit 8 is a display device that displays information processed by the CPU 41 as an image. For example, a liquid crystal display or an organic electro luminescence (EL) display is used as the display unit 8.

Units connected to the I/O 45 are not limited to the communication unit 4, the input unit 6, and the display unit 8. For example, another unit such as an image forming unit that forms the created flow definition on a recording medium such as paper may be connected to the I/O 45.

Next, the operation of the information processing apparatus 10 will be described in detail using FIG. 7.

Figure 7:
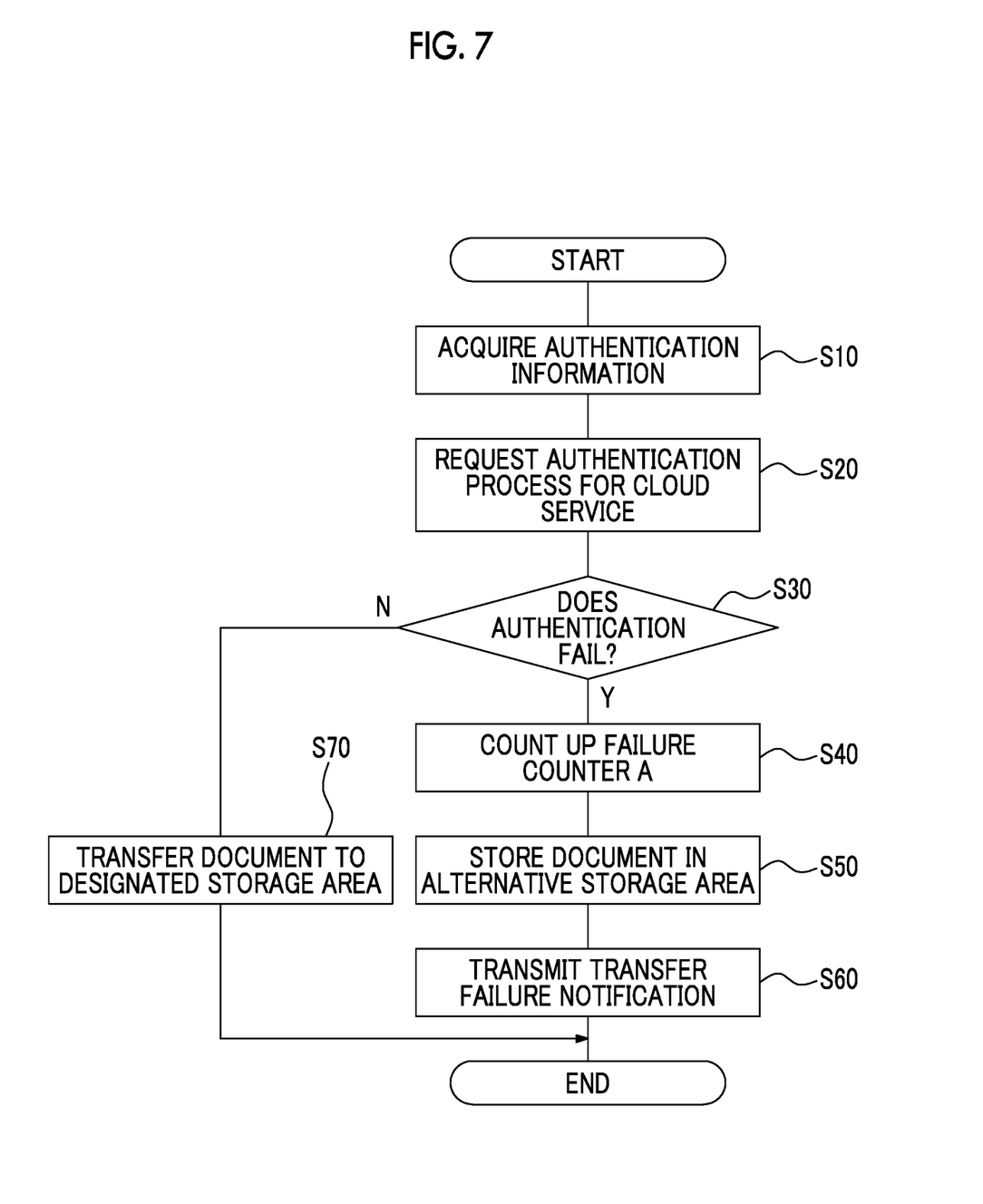
FIG. 7 is a flowchart illustrating one example of a flow of transfer process.

FIG. 7 is a flowchart illustrating one example of a flow transfer process executed by the CPU 41 in a case where the flow process is executed by the flow processing part 12, and the processed document is passed to the transfer part 13.

For example, an information processing program that regulates the transfer process is stored in advance in the ROM 42 of the information processing apparatus 10. The CPU 41 of the information processing apparatus 10 reads the information processing program stored in the ROM 42 and executes the transfer process.

First, in step S10, the CPU 41 acquires the authentication information corresponding to the user ID of the recipient of the generated processed document and the cloud service designated as the transfer destination of the processed document from the authentication information management table 22.

In step S20, the CPU 41 requests the transfer destination apparatus 30 providing the designated cloud service to perform the authentication process using the authentication information acquired in step S10 and the user ID corresponding to the acquired authentication information.

The transfer destination apparatus 30 notifies the information processing apparatus 10, which requests the authentication process, of the result of the authentication process. Thus, in step S30, the CPU 41 determines whether or not the authentication process fails in the transfer destination apparatus 30. In a case where the authentication process succeeds, a transition is made to step S70.

In step S70, the CPU 41 transfers the processed document to the storage area designated in advance in the transfer destination apparatus 30 and finishes the transfer process illustrated in FIG. 7. For example, the storage area designated in advance in the transfer destination apparatus 30 is set in advance by the recipient for each cloud service and is stored in the non-volatile memory 44.

In a case where it is determined that the authentication process fails in the determination process of step S30, a transition is made to step S40.

In step S40, the CPU 41 increases the value of a failure counter A corresponding to a combination of the recipient represented by the user ID and the cloud service acquired in step S10 by one. The failure counter A records the number of failures of transfer of the processed document for each combination of the recipient and the cloud service. The initial value of the failure counter A is set to "0", and the value of the failure counter A is increased by one each time transfer of the processed document fails. In a case where the processed document is transferred in step S70, the failure counter A corresponding to the combination of the recipient and the cloud service is set to "0".

In step S50, the CPU 41 stores the processed document that is not transferred to the transfer destination apparatus 30 due to the failure of the authentication process to the alternative storage area disposed in the non-volatile memory 44. In addition, the CPU 41 creates an internal transfer log corresponding to the processed document subjected to the failure of transfer and records the internal transfer log in the internal transfer management table 24. Specifically, the CPU 41 records the internal transfer log in the internal transfer management table 24 by setting the flow ID of the flow process generating the processed document, the user ID of the recipient of the generated processed document, the cloud service designated as the transfer destination of the processed document, the path of the alternative storage area storing the processed document and the file name of the processed document, and the path of the storage area to which the processed document is to be transferred in the transfer destination apparatus 30 and the file name of the processed document in the user ID, the used cloud service, the alternative storage destination, and the designated storage destination in the internal transfer log.

At this point, the sign "-" that indicates the recipient does not access the alternative storage area is set in the access history field of the internal transfer log.

Due to the failure of transfer of the processed document to the transfer destination apparatus 30, the CPU 41 in step S60 controls the communication unit 4 to transmit the transfer failure notification to an information apparatus designated in advance by the recipient of the processed document and finishes the transfer process illustrated in FIG. 7.

In a case where it is determined that the transfer destination apparatus 30 providing a specific cloud service has a malfunction, and the flow process of transferring the processed document to the transfer destination apparatus 30 having a malfunction is executed, the CPU 41 may start the transfer process from step S40 without executing each process of steps S10 to S30. That is, in a case where the transfer destination apparatus 30 that is the transfer destination of the processed document has a malfunction, the processed document is transferred to the alternative storage area without performing the authentication process with the transfer destination apparatus 30.

The CPU 41 determines the malfunction of the transfer destination apparatus 30 by confirming a response to a health check message that is periodically transmitted to each transfer destination apparatus 30. In addition, in a specific transfer destination apparatus 30, in a case where the authentication process consecutively fails a predetermined number of times or more even in a case where the authentication process is performed using any user ID, or in a case where a response to the authentication process from the transfer destination apparatus 30 does not arrive, the CPU 41 may determine that the transfer destination apparatus 30 has a malfunction.

In the information processing apparatus 10, the processed document is transferred to the alternative storage area even in a case where the processed document is not transferred to the transfer destination apparatus 30 due to a failure of the authentication process of the transfer destination apparatus 30.

Accordingly, the recipient who receives the transfer failure notification may obtain the processed document without executing the flow process again by acquiring the processed document from the alternative storage area shown in the transfer failure notification.

The recipient performs the internal authentication process with the information processing apparatus 10 using the internal authentication information set by the recipient. In a case where the internal authentication process succeeds, acquisition of the processed document from the alternative storage area is permitted. That is, browsing and acquisition of the processed document by other recipients are reduced, compared to those in a case where any recipient is permitted to freely access the alternative storage area.

Among the recipients who receive the transfer failure notification, some recipient wants to transfer the processed document subjected to the failure of transfer to the transfer destination apparatus 30 and acquire the processed document from the transfer destination apparatus 30 by changing the authentication information set in the information processing apparatus 10 to correct authentication information registered in the cloud service. Such a recipient transmits the change notification to the information processing apparatus 10.

Figure 8:
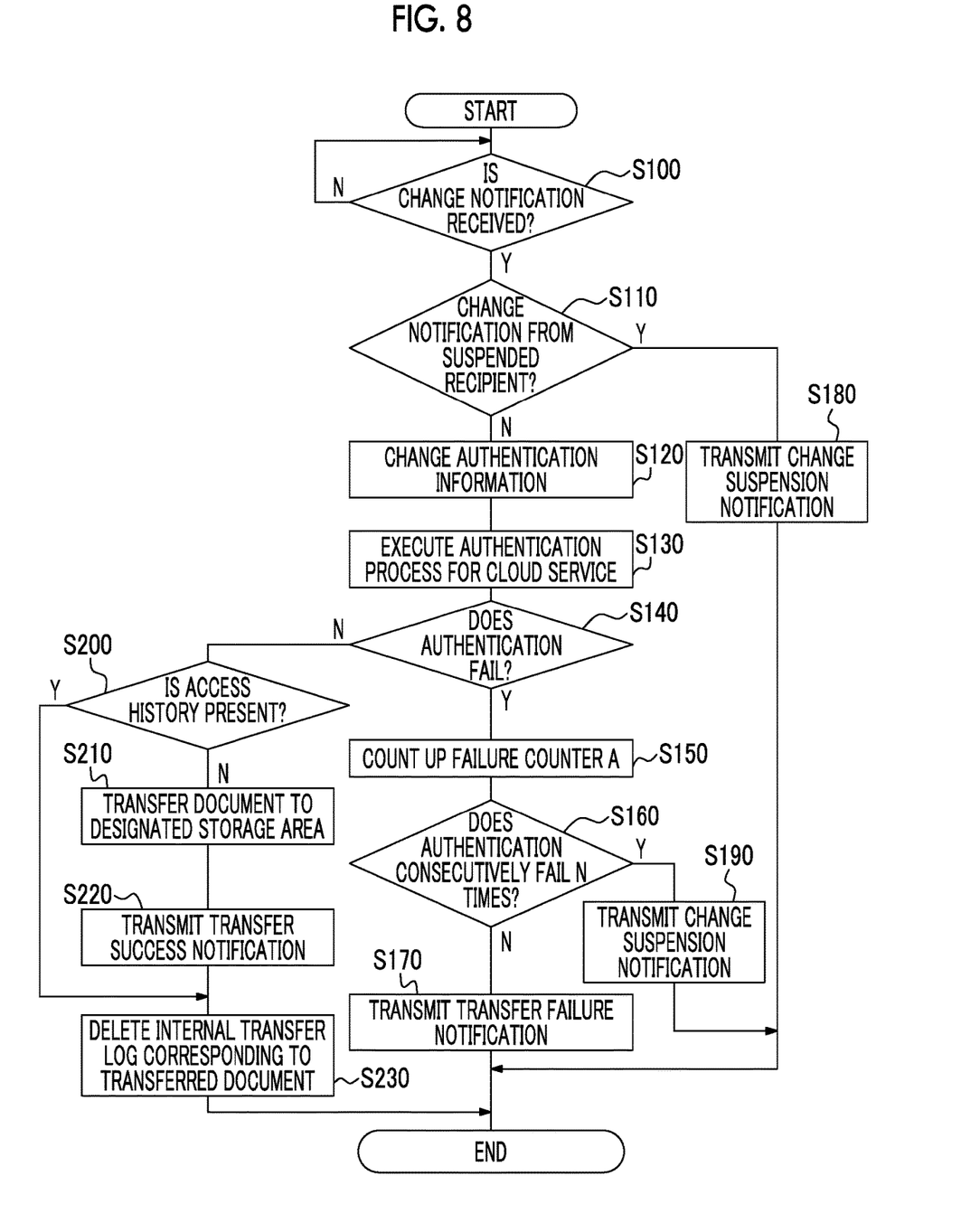
FIG. 8 is a flowchart illustrating one example of a flow of change notification process.

FIG. 8 is a flowchart illustrating one example of a flow of change notification process that is periodically executed by the CPU 41 in a case where the internal transfer log is recorded in the internal transfer management table 24. An interval for executing the change notification process illustrated in FIG. 8 can be adjusted.

For example, an information processing program that regulates the change notification process is stored in advance in the ROM 42 of the information processing apparatus 10. The CPU 41 of the information processing apparatus 10 reads the information processing program stored in the ROM 42 and executes the change notification process.

In step S100, the CPU 41 determines whether or not the change notification is received from the recipient. In a case where the change notification is not received, the determination process of step S100 is repeatedly executed, and reception of the change notification is monitored. In a case where the change notification is not received even after a preset time period, the change notification process illustrated in FIG. 8 may be finished. In a case where the change notification is received within the preset time period, a transition is made to step S110.

In step S110, the CPU 41 determines whether or not the change notification is transmitted from the recipient (hereinafter, referred to as a "suspended recipient") from which reception of the change notification is suspended. A condition for the recipient as the suspended recipient will be described below.

In a case where the change notification received in step S100 is the change notification from the suspended recipient, a transition is made to step S180.

In step S180, the CPU 41 transmits, to the information apparatus that transmits the change notification, a change suspension notification for notifying the information apparatus that the change notification process is suspended, and finishes the change notification process illustrated in FIG. 8. Accordingly, the recipient who transmits the change notification recognizes that change of the authentication information is suspended. In a case where change of the authentication information is suspended, for example, the change notification process is resumed by causing the suspended recipient to contact the manager of the information processing system 100.

In a case where it is determined that the change notification is transmitted from the recipient different from the suspended recipient in the determination process of step S110, a transition is made to step S120.

In step S120, the CPU 41 changes the authentication information corresponding to the user ID and the cloud service managed in the authentication information management table 22 to the authentication information after change designated in the change notification by referring to the user ID and the cloud service designated in the change notification.

In step S130, using the authentication information changed in step S120 and the user ID associated with the authentication information after change, the CPU 41 requests the transfer destination apparatus 30 providing the cloud service associated with the user ID and the authentication information after change in the authentication information management table 22 to perform the authentication process.

In step S140, the CPU 41 determines whether or not the authentication process in the transfer destination apparatus 30 fails, in the same manner as step S30 in FIG. 7. In a case where the authentication process fails, a transition is made to step S150.

In step S150, the CPU 41 increases the value of the failure counter A corresponding to the combination of the user ID of the recipient and the cloud service subjected to the failure of the authentication process by one, in the same manner as step S40 in FIG. 7.

In step S160, the CPU 41 determines whether or not the value of the failure counter A counted up in step S150 is greater than or equal to a threshold N (N is a positive integer), that is, whether or not the authentication process consecutively fails N times even after the authentication information is changed. In a case where the authentication process consecutively fails N times, it may be considered that another person who is different from the recipient of the processed document impersonates the recipient and tries to falsely acquire the processed document.

Accordingly, in a case where the authentication process consecutively fails N times, a transition is made to step S190. In step S190, the CPU 41 transmits the change suspension notification to the information apparatus that transmits the change notification. In addition, the CPU 41 sets the recipient represented by the user ID shown in the change notification as the suspended recipient and finishes the change notification process illustrated in FIG. 8.

Accordingly, as described in the determination process of step S110, even in a case where the change notification is subsequently received from the suspended recipient, the authentication process of the transfer destination apparatus 30 is not performed. Thus, the occurrence of a situation in which the processed document is falsely acquired by a third person is reduced.

The value of the threshold N is set to a value such that in a case where the authentication process consecutively fails a number of times corresponding to the value or more, it may be considered that a false access is made. For example, the value of the threshold N is set in advance in the non-volatile memory 44.

In a case where it is determined that the value of the failure counter A counted up in step S150 is less than the threshold N in the determination process of step S160, a transition is made to step S170.

In step S170, the CPU 41 transmits the transfer failure notification to the information apparatus designated in advance by the recipient of the processed document and finishes the change notification process illustrated in FIG. 8 in the same manner as step S60 in FIG. 7.

In a case where it is determined that the authentication process in the transfer destination apparatus 30 succeeds in the determination process of step S140, a transition is made to step S200.

In step S200, the CPU 41 acquires the internal transfer log associated with the user ID and the cloud service designated in the change notification by referring to the internal transfer management table 24 and determines whether or not an access history is recorded in the access history field of the acquired internal transfer log. In a case where an access history is not present, this case means that the recipient who transmits the change notification does not acquire the processed document from the alternative storage area.

Accordingly, in a case where an access history is not present, a transition is made to step S210. In step S210, the CPU 41 acquires the processed document from the alternative storage area designated in an alternative storage destination field of the internal transfer log acquired in step S200. The CPU 41 transfers the processed document acquired from the alternative storage area to the storage area (referred to as the "designated storage area") of the transfer destination apparatus 30 designated in a designated storage destination field of the internal transfer log acquired in step S200. The transferred processed document is deleted from the alternative storage area.

By transferring the processed document to the transfer destination apparatus 30 providing the designated cloud service, the CPU 41 in step S220 transmits, to the information apparatus that transmits the change notification, a transfer success notification for notifying the information apparatus that the processed document is transferred to the transfer destination apparatus 30.

In addition, since the processed document is transferred to the storage area of the transfer destination apparatus 30 from the alternative storage area, the CPU 41 in step S230 deletes the internal transfer log acquired in step S200 from the internal transfer management table 24 and finishes the change notification process illustrated in FIG. 8.

In a case where it is determined that an access history is recorded in the access history field of the acquired internal transfer log in the determination process of step S200, the processed document is already acquired from the alternative storage area by the recipient who transmits the change notification. That is, the CPU 41 does not need to transfer the processed document stored in the alternative storage area to the storage area of the transfer destination apparatus 30. Thus, the processed document stored in the alternative storage area does not need to be managed. Accordingly, a transition is made to step S230, and the internal transfer log acquired in step S200 is deleted from the internal transfer management table 24.

The information processing apparatus 10 requests the transfer destination apparatus 30 to perform the authentication process using the authentication information after change in a case where the change notification is received from the recipient to which the transfer failure notification is transmitted. In a case where the authentication process succeeds, and the recipient does not acquire the processed document from the alternative storage area, the information processing apparatus 10 transfers the processed document stored in the alternative storage area to the storage area of the transfer destination apparatus 30.

However, even in a case where the authentication process succeeds, it is also considered that the recipient accesses the alternative storage area and acquires the processed document from the alternative storage area in a case where the recipient does not acquire the processed document from the alternative storage area, that is, in a case where an access history is not present in the access history field of the internal transfer log that includes the cloud service provided by the transfer destination apparatus 30 subjected to the success in authentication process and the user ID subjected to the success in authentication process. In such a situation, in a case where the processed document is transferred to the transfer destination apparatus 30, the processed document is not present in the alternative storage area. Thus, the recipient who accesses the alternative storage area in order to acquire the processed document acquires the processed document from the transfer destination apparatus 30 and wastes effort.

Accordingly, even in a case where the authentication process succeeds, the information processing apparatus 10 may not transfer the processed document stored in the alternative storage area to the storage area of the transfer destination apparatus 30 until an elapse of a preset period from the transfer of the processed document to the alternative storage area in a case where the recipient does not acquire the processed document from the alternative storage area. That is, in a case where a preset condition is fulfilled (for example, after the elapse of the preset period) from the transfer of the processed document to the alternative storage area, the information processing apparatus 10 confirms an access history in the internal transfer log and transfers the processed document to the transfer destination apparatus 30 from the alternative storage area in a case where an access history is not present.

The preset period is set within a range of a period such that the capacity of the non-volatile memory 44 is sufficient even in a case where the processed document is stored in the alternative storage area.

The processes of the information processing apparatus 10 illustrated in FIG. 7 and FIG. 8 are described on the assumption that the authentication information set in the information processing apparatus 10 by the recipient is corrected to the authentication information registered in the transfer destination apparatus 30. It is also considered that the recipient corrects the authentication information registered in the transfer destination apparatus 30 to the authentication information set in the information processing apparatus 10. In this case, the recipient does not transmit the change notification to the information processing apparatus 10.

Accordingly, for example, the information processing apparatus 10 preferably confirms whether or not the authentication information registered in the transfer destination apparatus 30 is corrected in a period in which the change notification process illustrated in FIG. 8 is periodically executed.

Figure 9:
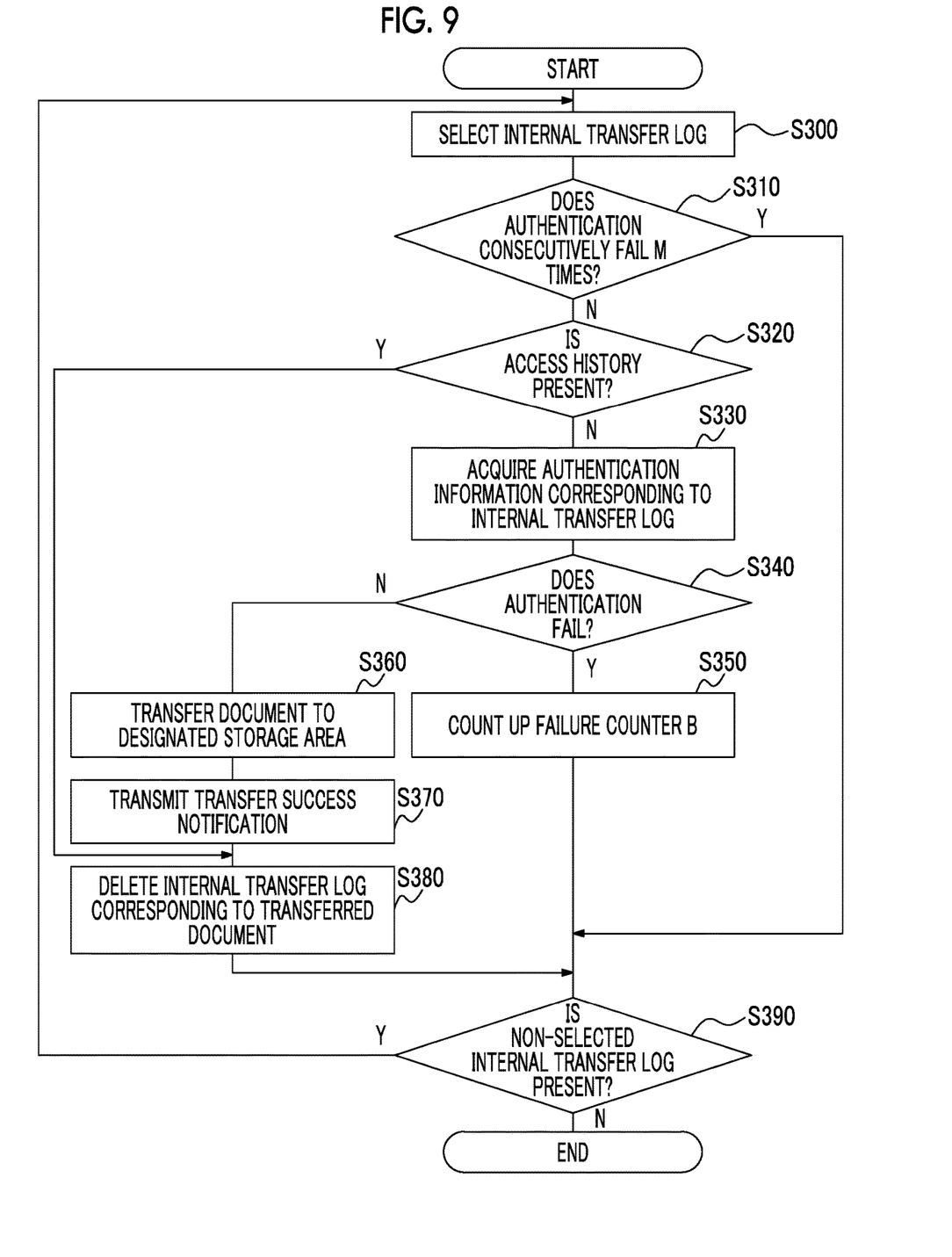
FIG. 9 is a flowchart illustrating one example of a flow of confirmation process.

FIG. 9 is a flowchart illustrating one example of a flow of confirmation process executed by the CPU 41 at a preset interval in a period in which the change notification process illustrated in FIG. 8 is periodically executed. The "preset interval" is set to an interval such that even in a case where the confirmation process illustrated in FIG. 9 is executed, the load factor of the CPU 41 is restricted to or below a threshold that is set as a load factor not causing a delay in other processes in the information processing apparatus 10.

It is assumed that at least one internal transfer log is present in the internal transfer management table 24. For example, an information processing program that regulates the confirmation process is stored in advance in the ROM 42 of the information processing apparatus 10. The CPU 41 of the information processing apparatus 10 reads the information processing program stored in the ROM 42 and executes the confirmation process.

In step S300, the CPU 41 selects one internal transfer log from the internal transfer management table 24.

In step S310, the CPU 41 determines whether or not the authentication process that is performed in the transfer destination apparatus 30 represented by the designated storage destination in the selected internal transfer log using the user ID in the internal transfer log selected in step S300 and the authentication information acquired from the authentication information management table 22 with respect to the user ID consecutively fails M times (M is a positive integer). The number of failures of the authentication process is recorded in a failure counter B.

The failure counter B is a counter in which the number of failures of the authentication process in the transfer destination apparatus 30 is recorded for each combination of the user ID and the cloud service. In a case where the value of the failure counter B associated with the combination of the user ID and the cloud service included in the internal transfer log selected in step S300 is equal to "M", the information processing apparatus 10 determines that the authentication process of the transfer destination apparatus 30 consecutively fails M times. The initial value of the failure counter B is set to "0", and the value of the failure counter B is increased by one each time the authentication process of the transfer destination apparatus 30 fails. In addition, in a case where the authentication process of the transfer destination apparatus 30 succeeds, the failure counter B is initialized to "0".

In a case where the authentication process of the transfer destination apparatus 30 consecutively fails M times, a transition is made to step S390. In step S390, the CPU 41 determines whether or not a non-selected internal transfer log that is not selected yet in step S300 is present in the internal transfer management table 24 by referring to the internal transfer management table 24. In a case where a non-selected internal transfer log is present, a transition is made to step S300. In step S300, the CPU 41 selects one non-selected internal transfer log from the internal transfer management table 24.

The authentication process is executed in the transfer destination apparatus 30 such that the processed document is not falsely transferred. However, in a case where the authentication process using the same user ID consecutively fails, the authentication information in which the user ID is used is regarded as a sign such that someone tries to falsely connect to the transfer destination apparatus 30. Accordingly, for example, the transfer destination apparatus 30 may block connection from the user ID subjected to L (L is a positive integer) consecutive failures of the authentication process. In order to allow the authentication process again from the user ID from which connection is blocked, a procedure such as contacting the cloud service provider managing the transfer destination apparatus 30 and explaining the situation may be needed, and effort is generally needed.

Accordingly, for the user ID subjected to M (M<L) consecutive failures of the authentication process of the transfer destination apparatus 30, processes are not performed in order to stop further requests to the transfer destination apparatus 30 for the authentication process using the same authentication information, and a process of selecting one non-selected internal transfer log from the internal transfer management table 24 is performed.

In a case where it is determined that a non-selected internal transfer log is not present in the determination process of step S390, the confirmation process illustrated in FIG. 9 is finished.

In a case where it is determined that the number of failures of the authentication process of the transfer destination apparatus 30 is less than M in the determination process of step S310, a transition is made to step S320.

In step S320, the CPU 41 determines whether or not an access history is recorded by referring to the access history field of the internal transfer log selected in step S300. In a case where an access history is not recorded, the recipient does not acquire the processed document from the alternative storage area. Thus, the processed document stored in the alternative storage area is transferred to the transfer destination apparatus 30.

Accordingly, in step S330, the CPU 41 acquires the user ID and the cloud service included in the internal transfer log selected in step S300 and acquires the authentication information corresponding to the combination of the user ID and the cloud service by referring to the authentication information management table 22.

In step S340, the CPU 41 requests the transfer destination apparatus 30 represented by the designated storage destination included in the internal transfer log selected in step S300 to perform the authentication process using the user ID and the authentication information acquired in step S330. The CPU 41 determines whether or not the authentication process fails. In a case where the authentication process fails, a transition is made to step S350.

Since the authentication process fails, the CPU 41 in step S350 increases the value of the failure counter B associated with the combination of the user ID and the cloud service acquired in step S330 by one. A transition is made to step S390, and a non-selected internal transfer log is selected.

In a case where it is determined that the authentication process succeeds in the determination process of step S340, a transition is made to step S360.

In step S360, the CPU 41 acquires the processed document from the alternative storage area represented by the alternative storage destination included in the internal transfer log selected in step S300 and transfers the acquired processed document to the storage area of the transfer destination apparatus 30 represented by the designated storage destination included in the internal transfer log selected in step S300.

Since the processed document is transferred to the transfer destination apparatus 30 providing the designated cloud service, the CPU 41 in step S370 transmits the transfer success notification to the information apparatus designated in advance by the recipient of the processed document. Accordingly, the recipient who changes the authentication information registered in the transfer destination apparatus 30 recognizes that the processed document is transferred to the transfer destination apparatus 30.

Since the processed document is transferred to the transfer destination apparatus 30, the CPU 41 in step S380 deletes the internal transfer log selected in step S300 from the internal transfer management table 24 and transitions to step S390.

In a case where it is determined that an access history is recorded in the internal transfer log selected in step S300 in the determination process of step S320, the processed document is already acquired from the alternative storage area by the recipient. Accordingly, a transition is made to step S380 without executing the processes of steps S360 and S370, and the internal transfer log selected in step S300 is deleted from the internal transfer management table 24.

By repeatedly executing the processes of steps S300 to S390 until all internal transfer logs included in the internal transfer management table 24 are selected, the processed document subjected to the failure of transfer may be transferred to the storage area of the transfer destination apparatus 30 from the alternative storage area even in a case where the change notification is not received from the recipient.

While the invention is described thus far using the exemplary embodiment, the invention is not limited to the scope disclosed in the exemplary embodiment. Various modifications or improvements can be made to the exemplary embodiment without departing from the nature of the invention, and exemplary embodiments to which such modifications or improvements are made also fall within the technical scope of the invention. For example, the order of processes may be changed without departing from the nature of the invention.

In addition, while software implementation of each process illustrated in FIG. 7 to FIG. 9 is illustratively described in the exemplary embodiment, a process that is equivalent to the flowcharts illustrated in FIG. 7 to FIG. 9 may be implemented in, for example, an application specific integrated circuit (ASIC) and may be processed by hardware. In this case, the speed of the process is increased, compared to that in a case where each process is implemented by software.

In addition, while installation of the information processing program in the ROM 42 is described in the exemplary embodiment, the invention is not limited thereto. The information processing program according to the exemplary embodiment of the invention may be provided as a record on a computer readable storage medium. For example, the information processing program according to the exemplary embodiment of the invention may be provided as a record on an optical disc such as a compact disc (CD)-ROM or a Digital Versatile Disc (DVD)-ROM. In addition, the information processing program according to the exemplary embodiment of the invention may be provided as a record in a semiconductor memory such as a Universal Serial Bus (USB) memory and a flash memory. Furthermore, the information processing apparatus 10 may acquire the information processing program according to the exemplary embodiment of the invention from an external apparatus, not illustrated, through the communication line 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a storage device configured to store a program; and
a processor connected to the storage device and configured to execute the program to:
in a case where an authentication process for connecting to a preset first storage area fails and transfer of a document to the first storage area fails, transfer the document to a second storage area, and in a case where the authentication process succeeds after the document is transferred to the second storage area, transfer the document stored in the second storage area to the first storage area.

2. The information processing apparatus according to claim 1, wherein
the processor further notifies a recipient of the document of storage destination information related to the document in the second storage area in a case where the authentication process fails.

3. The information processing apparatus according to claim 2,
wherein even in a case where the authentication process succeeds after the document is transferred to the second storage area, the processor does not transfer the document stored in the second storage area to the first storage area until a preset period is elapsed after the transfer of the document to the second storage area in a case where an acquisition history indicating that the recipient of the document acquires the document from the second storage area is not present.

4. The information processing apparatus according to claim 3,
wherein in a case where the acquisition history is present, the processor does not transfer the document stored in the second storage area to the first storage area.

5. The information processing apparatus according to claim 2,
wherein in a case where the authentication process continues at a preset time interval using the failed authentication information, and the authentication process succeeds, the processor transfers the document stored in the second storage area to the first storage area.

6. The information processing apparatus according to claim 3,
wherein in a case where the authentication process continues at a preset time interval using the failed authentication information, and the authentication process succeeds, the processor transfers the document stored in the second storage area to the first storage area.

7. The information processing apparatus according to claim 4,
wherein in a case where the authentication process continues at a preset time interval using the failed authentication information, and the authentication process succeeds, the processor transfers the document stored in the second storage area to the first storage area.

8. The information processing apparatus according to claim 5,
wherein the processor determines whether the authentication process using the failed authentication information has failed and stops the authentication process using the failed authentication information in a case where the authentication process using the failed authentication information has consecutively been determined as being failed for a number of times equal to or larger than a threshold.

9. The information processing apparatus according to claim 6,
wherein the processor determines whether the authentication process using the failed authentication information has failed and stops the authentication process using the failed authentication information in a case where the authentication process using the failed authentication information has consecutively been determined as being failed for a number of times equal to or larger than a threshold.

10. The information processing apparatus according to claim 7,
wherein the processor determines whether the authentication process using the failed authentication information has failed and stops the authentication process using the failed authentication information in a case where the authentication process using the failed authentication information has consecutively been determined as being failed for a number of times equal to or larger than a threshold.

11. A non-transitory computer readable medium storing an information processing program causing a computer to function as:
in a case where an authentication process for connecting to a preset first storage area fails and transfer of a document to the first storage area fails, transferring the document to a second storage area, and in a case where the authentication process succeeds after the document is transferred to the second storage area transferring the document stored in the second storage area to the first storage area.

* * * * *